(12) United States Patent
Clark et al.

(10) Patent No.: US 8,612,412 B2
(45) Date of Patent: Dec. 17, 2013

(54) SEARCHING FOR A DIRECTORY IN A FILE SYSTEM

(75) Inventors: Timothy P. Clark, Rochester, MN (US); Cory J. Miller, Rochester, MN (US); Richard M. Theis, Sauk Rapids, MN (US)

(73) Assignee: International Business Machines Corporation, Armonk, NY (US)

( * ) Notice: Subject to any disclaimer, the term of this patent is extended or adjusted under 35 U.S.C. 154(b) by 1637 days.

(21) Appl. No.: 11/752,977

(22) Filed: May 24, 2007

(65) Prior Publication Data
US 2008/0294600 A1 Nov. 27, 2008

(51) Int. Cl.
*G06F 17/30* (2006.01)
*G06F 7/00* (2006.01)

(52) U.S. Cl.
USPC .......................................... 707/706; 707/722

(58) Field of Classification Search
USPC ................... 707/4, 5, 6, 3, 10, 101, 706, 722; 705/80
See application file for complete search history.

(56) References Cited

U.S. PATENT DOCUMENTS

| 3,670,310 | A | * | 6/1972 | Bharwani et al. | 707/3 |
|---|---|---|---|---|---|
| 5,303,361 | A | * | 4/1994 | Colwell et al. | 707/4 |
| 5,873,077 | A | * | 2/1999 | Kanoh et al. | 707/3 |
| 6,098,066 | A | * | 8/2000 | Snow et al. | 707/3 |
| 6,460,036 | B1 | * | 10/2002 | Herz | 707/10 |
| 6,484,168 | B1 | * | 11/2002 | Pennock et al. | 707/6 |
| 6,728,707 | B1 | * | 4/2004 | Wakefield et al. | 707/5 |
| 6,944,609 | B2 | * | 9/2005 | Witbrock | 707/3 |
| 2003/0182274 | A1 | * | 9/2003 | Oh | 707/3 |
| 2004/0139031 | A1 | * | 7/2004 | Amaitis et al. | 705/80 |
| 2007/0043750 | A1 | * | 2/2007 | Dingle | 707/101 |

* cited by examiner

Primary Examiner — Pavan Mamillapalli
(74) Attorney, Agent, or Firm — Biggers & Chanian, LLP; James R. Nock

(57) ABSTRACT

Methods, apparatus, and products for searching for a directory in a file system are disclosed that include selecting, by a word selection module for inclusion in a word list, a word of text whose frequency of occurrence meets a predefined criterion; inserting, by the word selection module into the word list, the selected word; inserting, by an indexing module into a search index, the selected word in association with the directory name; receiving, by a search module from a user, a search request that includes the selected word; and returning, by the search module to the user in dependence upon the search request and the search index, a search result that includes the directory name. The directory is characterized by a directory name and includes computer storage resources, the computer storage resources including words of text, each word of text characterized by a frequency of occurrence among the computer storage resources.

15 Claims, 6 Drawing Sheets

SEARCHING FOR A DIRECTORY IN A FILE SYSTEM

BACKGROUND OF THE INVENTION

1. Field of the Invention

The field of the invention is data processing, or, more specifically, methods, apparatus, and products for searching for a directory in a file system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas in which progress has been made is in searching for a directory in a file system. As file systems become repositories for more and more computer storage resources, users have increasing difficulty finding the file system locations that they desire. Users may easily generate hundreds or thousands of documents, images, and movies files in a year. To organize these computer storage resources, many users will create a complex hierarchy of directories. This hierarchy may aid in the initial organization of files, but as months and years pass, the complexity of the directory structure actually obscures the information that it was created to hold. For example, a user may intend to organize vacation photos in /Documents/Travel/Vacations. By the time the user wants to add photos of the next vacation, the structure has been forgotten and the new photos are placed in /Documents/Photos/2006. As a result, related items are scattered throughout the file system, and the carefully organized hierarchy is no help when the user attempts to retrieve all the vacation photos.

Within hierarchical file systems, tools like Google Desktop Search™ and Windows Desktop Search™ have tackled the problem of locating particular files. However, they provide little help for the user who is attempting to find where to insert new files into the system. Alternatively, system designers have attempted to provide file system navigation that eliminates or de-emphasizes hierarchical structure. In the Macintosh™ operating system, Spotlight™ and "smart folders" provide a way to access files and directories without ever knowing where in the file system structure they are located. Although these solutions provide methods for recalling existing files, they are inadequate for users trying to find general "areas" or directories containing similar files in the file system.

SUMMARY OF THE INVENTION

Methods, apparatus, and products for searching for a directory in a file system are disclosed that include selecting, by a word selection module for inclusion in a word list, a word of text whose frequency of occurrence meets a predefined criterion; inserting, by the word selection module into the word list, the selected word; inserting, by an indexing module into a search index, the selected word in association with the directory name; receiving, by a search module from a user, a search request that includes the selected word; and returning, by the search module to the user in dependence upon the search request and the search index, a search result that includes the directory name. The directory is characterized by a directory name and includes computer storage resources, the computer storage resources including words of text, each word of text characterized by a frequency of occurrence among the computer storage resources.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
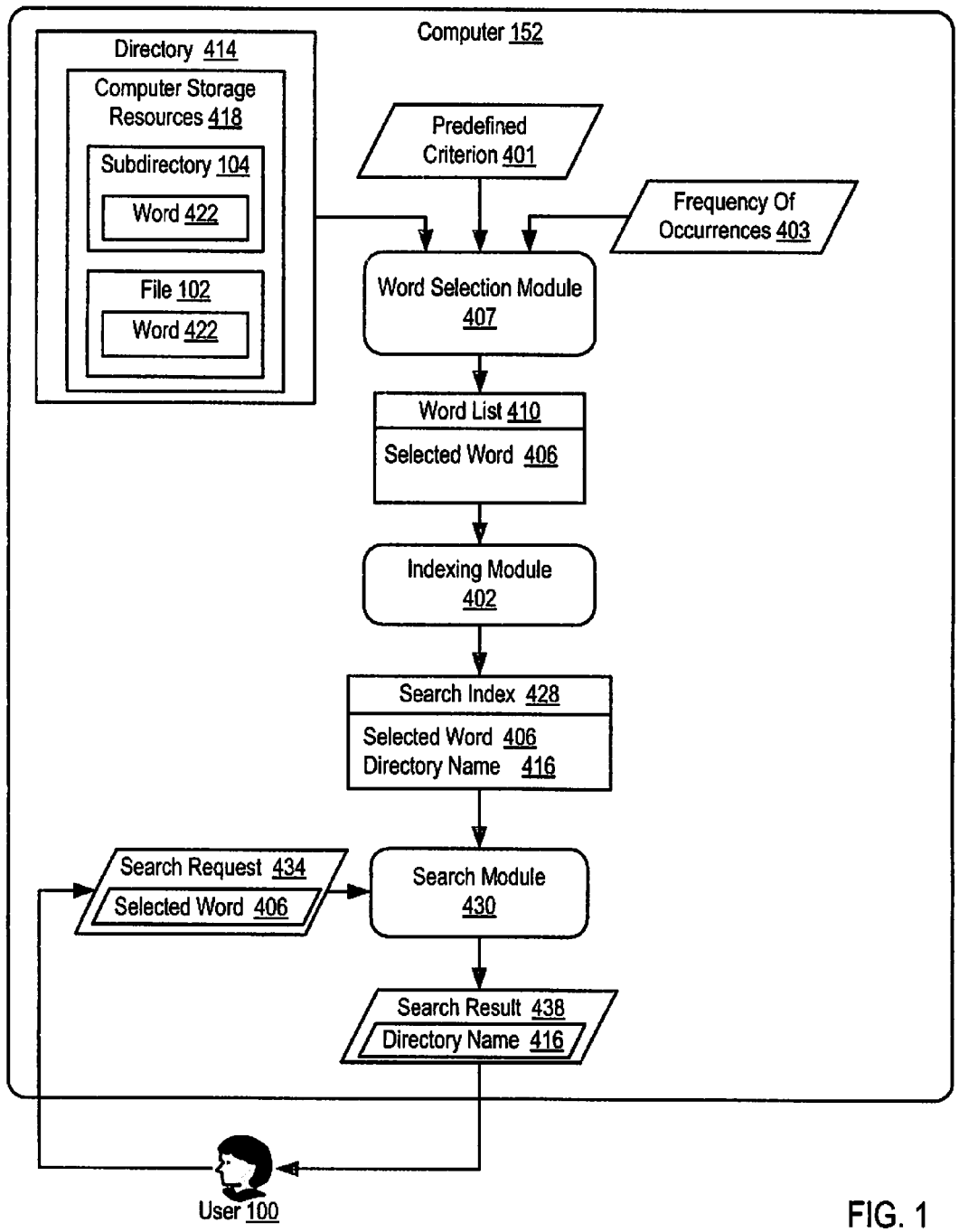
FIG. 1 sets forth a functional block diagram of an exemplary computer useful for searching for a directory in a file system according to embodiments of the present invention.

Exemplary methods, apparatus, and products for searching for a directory in a file system in accordance with the present invention are described with reference to the accompanying drawings, beginning with FIG. 1. FIG. 1 sets forth a functional block diagram of an exemplary computer (152) useful for searching for a directory in a file system according to embodiments of the present invention. A directory is a data structure in a file system that contains a group of computer storage resources, such as files or other directories. A typical file system contains thousands of computer storage resources, and directories organize the computer storage resources. A directory contained inside another directory is called a subdirectory. The collection of directories and subdirectories in a file system form a hierarchy, or tree structure.

The computer (152) of FIG. 1 includes a directory (414) which, in turn, includes computer storage resources (418). The computer storage resources (418) include words of text (422). A word of text may be contained within a computer storage resource, included as part of the name of a computer storage resource, or contained in the metadata of a computer storage resource. Metadata of a computer storage resource may include properties describing a computer storage resource. Consider, for example, properties describing a computer storage resource that is a document. Properties describing a document may include, for example, the date the document was created, the date the document was last modified, the title of the document, the name of the author of the document, an abstract of the document, and so on. Each property describing the document may include words of text. Each word of text in a computer storage resource is characterized by a frequency of occurrence (403) among the computer storage resources (418). That is, each word of text occurs a number of times within a number of computer storage resources in a directory. In the computer (152) of FIG. 1, the computer storage resources (418) include a subdirectory (104) and a file (102). The subdirectory (104) and file (102) each include a word of text (422).

The computer (152) of FIG. 1 has installed upon it a word selection module (407), an indexing module (402), and a search module (430). The word selection module (407) is implemented as computer program instructions that search for a directory in a file system by selecting, for inclusion in a word list (410), a word of text (422) whose frequency of occurrence (403) meets a predefined criterion (401). The word selection module (407) selects a word of text (422) whose frequency of occurrence (403) meets a predefined criterion (401) by scanning the computer storage resources for words of text (422), and for each word of text found, the word selection module (407) determines the frequency of occurrence (403). When the word selection module (407) determines the frequency of occurrence (403) for the word of text, the word selection module (407) compares the frequency of occurrence (403) to the predefined criterion (401). If the frequency of occurrence (403) for the word of text meets or exceeds the predefined criterion (401), the word selection module (407) selects the word of text for inclusion in a word list (410).

The word selection module (407) of FIG. 1 also inserts, into the word list (410), the selected word (406). A word list is any data structure useful for storing selected words. The following is an example of a word list implemented in extensible markup language ('XML'):

```
<wordList directoryName= "MyDocuments">
    <text Word = "Family">
        <location ComputerStorageResource = "Family.txt">
            <frequency count = "30"></frequency>
        </location>
        <location ComputerStorageResource = "Family Tree.jpg">
            <frequency count= "1"></frequency>
        </location>
    </text>
    <text Word= "Taxes">
        <location ComputerStorageResource = "Budget.xls">
            <frequency count= "3"></frequency>
        </location>
        <location ComputerStorageResource = "Taxes.doc">
            <frequency count= "9"></frequency>
        </location>
    </text>
    ...
</wordList>
```

This example XML sets forth a word list for a directory named MyDocuments. The word list includes two selected words, Family and Budget. The selected word, Family, occurs in two computer storage resources in the directory, Family.txt and Family Tree.jpg. Family occurs 30 times in Family.txt and 1 time in Family Tree.jpg. The selected word, Budget, also occurs in two computer storage resources in the directory, Budget.xls and Taxes.doc. Budget occurs 3 times in Budget.xls and 9 times in Taxes.doc. Although this example word list is implemented in XML, a word list useful for searching for a directory in a file system according to embodiments of the present invention may also be implemented as a table, a linked list, an array, or any other data structure. This example word list contains information describing the location and frequency of occurrence of each selected word of text for clarity, but readers of skill in the art will recognize that such a word list may contain only the selected word with no extra information describing the selected word. Word lists useful for searching for a directory in a file system according to embodiments of the present invention may be stored in various ways, including for example, within the directory associated with the word list.

The indexing module (402) of FIG. 1, is implemented as computer program instructions that insert, into a search index (428), the selected word (406) in association with the directory name (416). A search index (428) is a data structure that contains words of text in a directory associated with the directory name. A search index (428) may be implemented as a table in a database, such as for example, a table similar to Table 1.

TABLE 1

| Search Index | |
| --- | --- |
| Selected Word | Directory Name |
| Taxes | Budget |
| Family | Genealogy |
| Picture | MyPictures |
| Table | Furniture |
| Cat | Pets |
| Dog | Pets |

Each row of Table 1 includes a selected word associated with a directory name. The selected words, Cat and Dog, for example are each associated with the directory name Pets. That is, Cat and Dog occur among the computer storage resources in the directory named Pets. The indexing module (402) may insert a selected word in association with a directory name into a search index, such as the search index of Table 1, by, for example, the following Structured Query Language ('SQL') statements:

```
INSERT INTO Search Index (Selected Word, Directory Name)
VALUES ('Taxes', 'Budget');
INSERT INTO Search Index (Selected Word, Directory Name)
VALUES ('Family', 'Genealogy');
INSERT INTO Search Index (Selected Word, Directory Name)
VALUES ('Picture', 'MyPictures');
INSERT INTO Search Index (Selected Word, Directory Name)
VALUES ('Table', 'Furniture');
INSERT INTO Search Index (Selected Word, Directory Name)
VALUES ('Cat', 'Pets');
INSERT INTO Search Index (Selected Word, Directory Name)
VALUES ('Dog', 'Pets');
```

These example SQL statements insert a selected word and the directory name associated with the selected word into a table named Search Index that has two columns named Selected Word and Directory Name. The SQL statements insert into the Selected Word column of the table, the words Taxes, Family, Picture, Table, Cat, and Dog. The SQL statements also insert into the Directory Name column of the table, the directory names associated with the selected words, Budget, Genealogy, MyPictures, Furniture, and Pets. Although a search index is described here as a table containing only two columns, readers of skill in the art will recognize a search index useful for finding a directory in a file system may include many other columns that contain information describing the selected word or directory, such as, for example, a column describing each computer storage resource in which the selected word occurs, the frequency of occurrence of the selected word, properties of the directory, and so on.

The search module (430) of FIG. 1 is implemented as computer program instructions that search for a directory in a file system by receiving, from a user (100), a search request (434) that includes the selected word (406). A user may enter a search request (430) through a user input device, such as, for example, a keyboard or mouse. A search request may include multiple words of text, such as, for example a search request for "Family Pictures."

The search module (430) of FIG. 1 also returns a search result (438) that includes the directory name (416) to the user (100), in dependence upon the search request (434) and the search index (428). The search module (430) may return a search result (438) that includes the directory name (416) to the user (100) by scanning the search index (428) for words that match the selected word (406) included in the search request (434). When the search module (430) identifies, in the search index (428), the selected word (406) included in the search request (434), the search module (430) inserts, into a search result (438), the directory name (416) that is associated with the selected word in the search index. Consider the example search index of Table 1. When a user enters a search request that includes the selected word, Family, the search module scans the search index for the word Family. When the search module identifies the word Family in the search index, the search module inserts the directory name, Genealogy, into a search result. That is, for a search request including the word Family, the search result includes the directory name Genealogy. Readers of skill in the art will immediately recognize that for a search request including multiple words, such as, for example, "Dog Pictures," the search module may return multiple search results, each including a directory name. For a search request containing the word "Dog Pictures," for example, the search module returns to the user a search result including MyPictures and a search result including Pets.

Searching for a directory in a file system in accordance with the present invention is generally implemented with computers, that is, with automated computing machinery. For further explanation, therefore, FIG. 2 sets forth a block diagram of automated computing machinery comprising an exemplary computer (152) useful in searching for a directory in a file system according to embodiments of the present invention. The computer (152) of FIG. 2 includes at least one computer processor (156) or 'CPU' as well as random access memory (168) ('RAM') which is connected through a system bus (160) to processor (156) and to other components of the computer.

Stored in disk drive (170) is a directory (414). The directory (414) is characterized by a directory name (416). The directory (414) of FIG. 2 includes computer storage resources (418). The computer storage resources (418) include words of text (422). Each word of text (422) is characterized by a frequency of occurrence (403) among the computer storage resources (418).

Stored in RAM (168) is a word selection module (407), a module of computer program instructions for searching for a directory in a file system according to embodiments of the present invention that select, for inclusion in a word list (410), a word of text (422) whose frequency of occurrence (403) meets a predefined criterion (401). The word selection module (407) selects a word of text (422) whose frequency of occurrence (403) meets a predefined criterion (401) by scanning the computer storage resources for words of text (422), and for each word of text found, the word selection module (407) determines the frequency of occurrence (403). When the word selection module (407) determines the frequency of occurrence (403) for the word of text, the word selection module compares the frequency of occurrence (403) to the predefined criterion (401). If the frequency of occurrence (403) for the word of text meets or exceeds the predefined criterion (401), the word selection module (402) selects the word of text for inclusion in a word list (410). The word selection module (402) also inserts, into the word list (410), the selected word (406). Also stored in RAM (168), is an indexing module (402), a module of computer program instructions that insert, into a search index (428), the selected word (406) in association with the directory name (416).

Also stored in RAM (168) is a search module (430), a module of computer program instructions for searching for a directory in a file system according to embodiments of the present invention that receive, from a user (100), a search request (434) that includes the selected word (406). A user (100) may enter a search request (434) by using a user input device (181). User input devices (181) useful for searching for a directory in a file system include keyboards, mice, and other input devices as will occur to those of skill in the art. The search module (430) also returns, to the user (100) in dependence upon the search request (434) and the search index (428), a search result (438) that includes the directory name (416).

Also stored in RAM (168) is an operating system (154). Operating systems useful in computers according to embodiments of the present invention include UNIX™, Linux™, Microsoft Vista™, Microsoft XP™, AIX™, IBM's i5/OS™, and others as will occur to those of skill in the art. Operating system (154), word selection module (407) frequency of occurrence (403), selected words (406), predefined criterion (401), word list (410), indexing module (402), search index (428), search module (430), search request (434), and search result (438) in the example of FIG. 2 are shown in RAM (168), but many components of such software typically are stored in non-volatile memory also, for example, on a disk drive (170).

Figure 2:
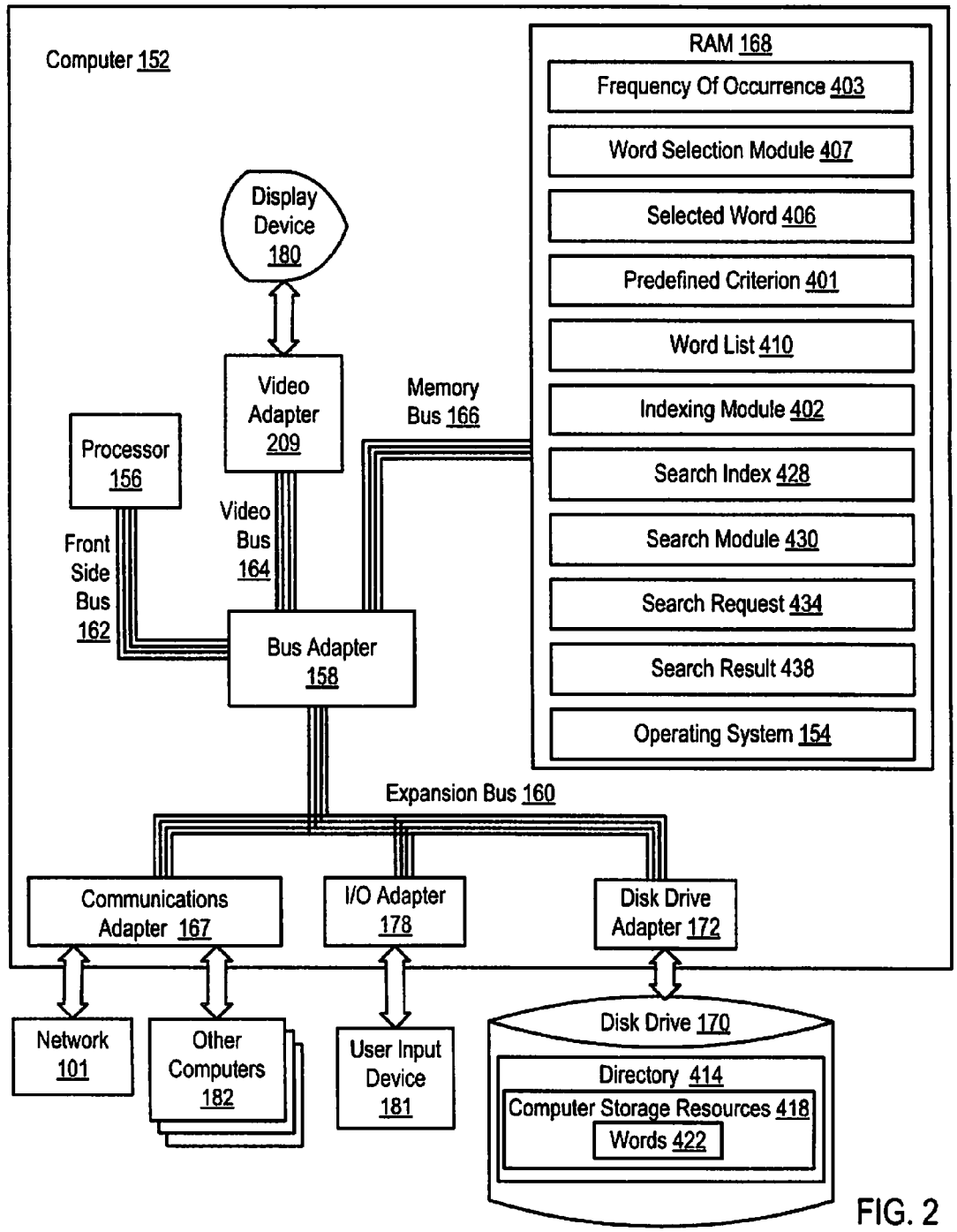
FIG. 2 sets forth a block diagram of automated computing machinery comprising an exemplary computer useful in searching for a directory in a file system according to embodiments of the present invention.

The computer (152) of FIG. 2 includes a bus adapter (158), a computer hardware component that contains drive electronics for the high speed buses, the front side bus (162), the video bus (164), and the memory bus (166), as well as drive electronics for the slower expansion bus (160). Examples of bus adapters useful for searching for a directory in a file system according to embodiments of the present invention include the Intel Northbridge, the Intel Memory Controller Hub, the Intel Southbridge, and the Intel I/O Controller Hub. Examples of expansion buses useful for searching for a directory in a file system according to embodiments of the present invention include Industry Standard Architecture ('ISA') buses and Peripheral Component Interconnect ('PCI') buses.

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers include Integrated Drive Electronics ('IDE') adapters, Small Computer System Interface ('SCSI') adapters, and others as will occur to those of skill in the art. In addition, non-volatile computer memory may be implemented for a computer as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters in computers implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182) and for data communications with a data communications network (101). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for searching for a directory in a file system according to embodiments of the present invention include modems for wired dial-up communications, Ethernet (IEEE 802.3) adapters for wired data communications network communications, and 802.11 adapters for wireless data communications network communications.

Figure 3:
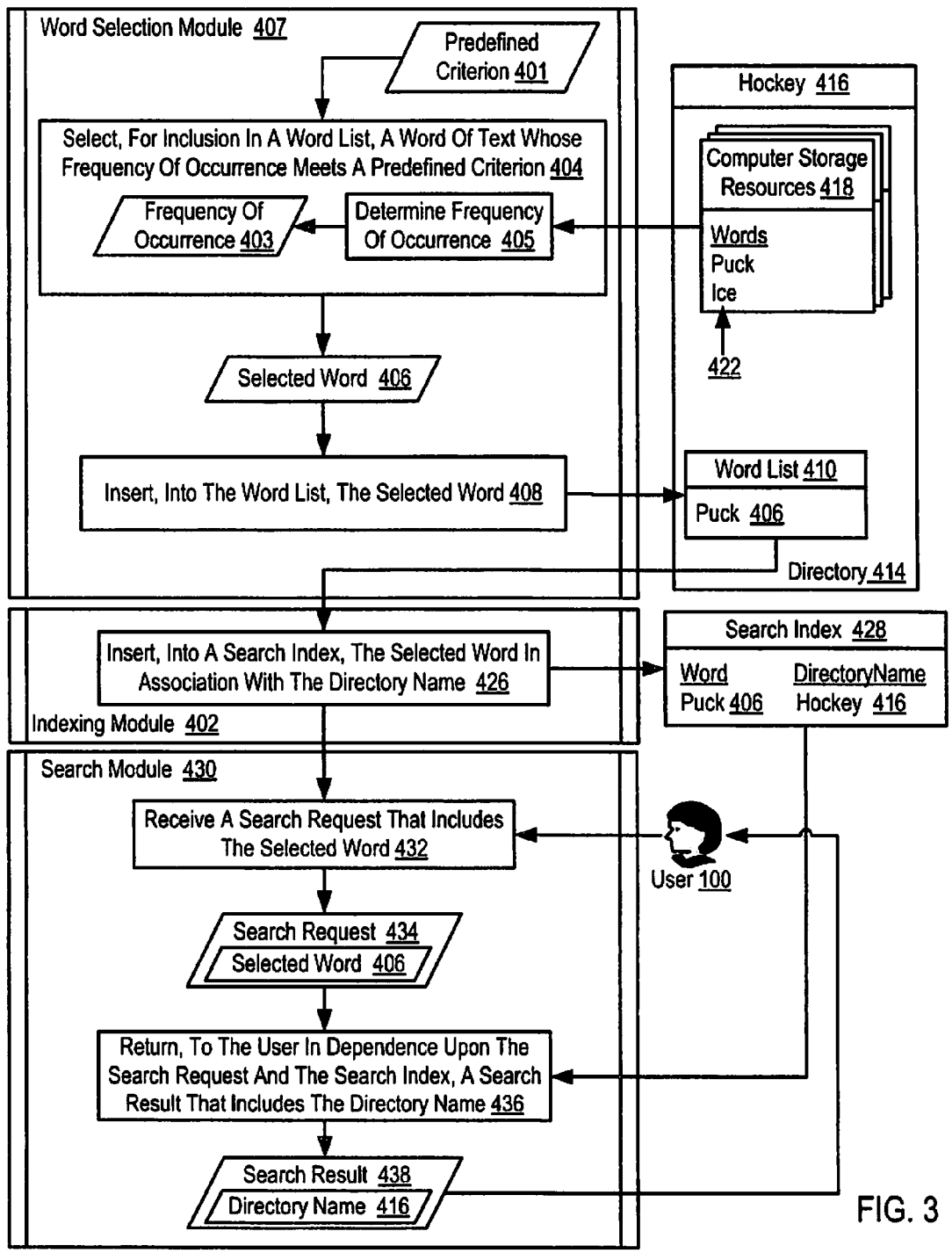
FIG. 3 sets forth a flow chart illustrating an exemplary method for searching for a directory in a file system according to embodiments of the present invention.

For further explanation, FIG. 3 sets forth a flow chart illustrating an exemplary method for searching for a directory in a file system according to embodiments of the present invention. The directory (414) of FIG. 3 is characterized by an exemplary directory name (416), Hockey. The directory (414) includes computer storage resources (418) which include words of text (422). Each word of text (422) is characterized by a frequency of occurrence (403) among the computer storage resources (418).

The method of FIG. 3 includes selecting (404), by an word selection module (407) for inclusion in a word list (410), a word of text (422) whose frequency of occurrence (403) meets a predefined criterion (401). In the method of FIG. 3, selecting (404) a word of text (422) is carried out by determining (405) a frequency of occurrence (403) for the word (422) of text. The word selection module (407) may determine (405) the frequency of occurrence (403) for the word of text (422) by scanning the computer storage resources (418) for a word of text and calculating the number of times the word of text occurs in each computer storage resource. A word of text may, for example, occur 23 times in 1 computer resource, or 1 time in each of 3 computer resources. If a word of text has a frequency of occurrence that meets a predefined criterion, the word of text is selected for inclusion in a word list. In the example computer storage resources (418) of FIG. 3, the words of text (422) include Puck and Ice. The selected word (406), Puck, has a frequency of occurrence (403) that meets the predefined criterion (401). The words Puck and Ice are used here for exemplary purposes only, but readers of skill in the art will recognize that computer storage resources useful for searching for a directory in a file system may contain any number of words of text.

The method of FIG. 3 also includes inserting (408), by the word selection module (407) into the word list (410), the selected word (406). Depending upon the implementation of the word list, the word selection module (407) may insert (408) the selected word (406) into the word list in a number of ways. For a word list implemented in XML, for example, the selected word may be inserted into a text element. For a word list implemented as table in database having only a single column for selected, the word selection module (407) may insert the selected word by using an SQL insert statement, such as the following SQL statement:

---
INSERT INTO Word List (Words)
VALUES ('Puck');
---

The example SQL statement inserts the selected word Puck into a table named Word List having a single column named Words. The word selection module (407) may insert into the word list each word contained in the computer storage resources whose frequency of occurrence meets the predefined criterion. Although the word list (410) of FIG. 3 includes only one selected word (406), Puck, readers of skill in the art will recognize that a word list useful for searching for a directory in a file system may contain many selected words. Although word lists useful for searching for a directory in a file system according to embodiments of the present invention may be stored in various ways, the word list (410) of FIG. 3 is stored in the directory (414).

The method of FIG. 3 also includes inserting (426), by an indexing module (402) into a search index (428), the selected word (406) in association with the directory name (416). In the method of FIG. 3, the search index is a table having two columns, Word and DirectoryName. In the Word column, the indexing module has inserted the selected word (406), Puck. In the DirectoryName column the indexing module (402) has inserted the directory name (416), Hockey.

The method of FIG. 3 also includes receiving (432), by a search module (430) from a user (100), a search request (434) that includes the selected word (406). A user may enter a search request (434) through any user input device such as a keyboard or a mouse. A search request may include more than one word of text.

The method of FIG. 3 also includes returning (436), by the search module (430) to the user (100) in dependence upon the search request (434) and the search index (428), a search result (438) that includes the directory name (416). The search module (430) may (436) return a search result (438) that includes the directory name (416) to the user (100) by scanning the search index (428) for words that match the selected word (406) included in the search request (434). When the search module (430) identifies, in the search index (428), the selected word (406) included in the search request (434), the search module (430) inserts, into a search result (438), the directory name (416) that is associated with the selected word (406) in the search index (428). A search result for a search request including the selected word, Puck, according to the method depicted in FIG. 3 includes the directory name, Hockey.

Figure 4:
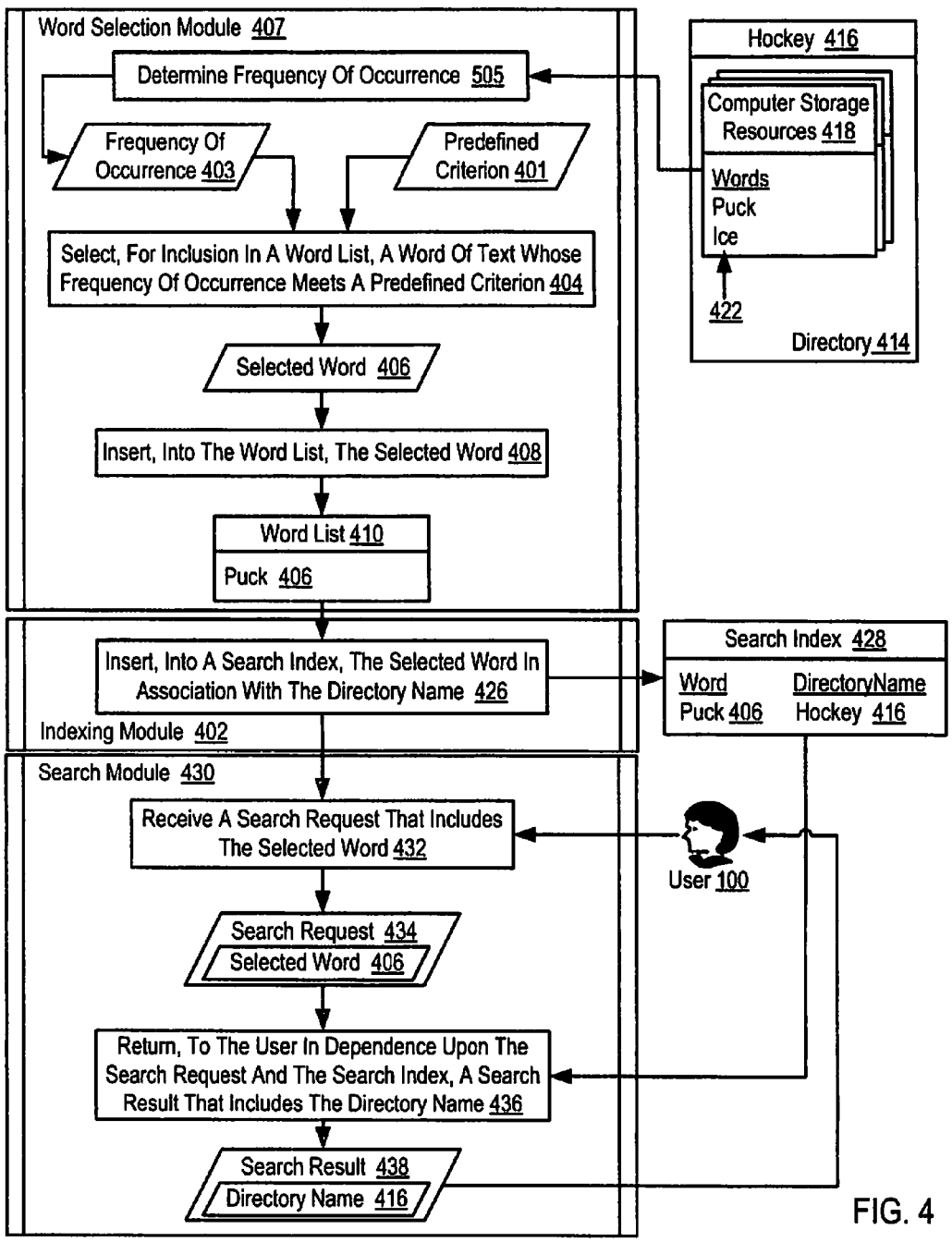
FIG. 4 sets forth a flow chart illustrating an exemplary method for searching for a directory in a file system according to embodiments of the present invention.

For further explanation, FIG. 4 sets forth a flow chart illustrating an exemplary method for searching for a directory in a file system according to embodiments of the present invention. The method of FIG. 4 is similar to the method of FIG. 3, including as it does the word selection module's (407) selecting (404) a word of text (422) whose frequency of occurrence (403) meets a predefined criterion (401), the word selection module's (407) inserting (408) the selected word (406) into the word list (410), the indexing module's (402) inserting (426) the selected word (406) in association with the directory name (416) into a search index (428), the search module's (430) receiving (432) a search request (434) that includes the selected word (406), and the search module's (430) returning (436) a search result (438) that includes the directory name (416), all of which operate in a similar manner as described above.

The method of FIG. 4, however, includes an alternative to determining (405) the frequency of occurrence when the word selection module selects (404) a word of text. The method of FIG. 4 includes determining (505), by the word selection module (407) asynchronously with respect to selecting (404) a word text (422) whose frequency of occurrence (403) meets a predefined criterion (401), a frequency of occurrence (403) for the word of text (422). That is, the word selection module may determine (505) the frequency of occurrence (403) of the word of text (422) before (404) selecting a word of text for inclusion in a word list. The word selection module may determine (505) the frequency of occurrence (403) for the word of text (422), asynchronously with respect to selecting (404) a word text (422) whose frequency of occurrence (403) meets a predefined criterion (401), by scanning the computer storage resources (418) for a word of text and calculating the number of times the word of text occurs in each computer storage resource. The frequency of occurrence (403) for each word may be stored for later use by the word selection module in any data structure, such as a table or an array. The word selection module may determine (505) the frequency of occurrence for a word of text, each time a computer resource is created or modified in a directory, or the word selection module may determine (505) the frequency of occurrence for a word of text at a predefined interval, such as, for example, every night at 10:00 pm.

Figure 5:
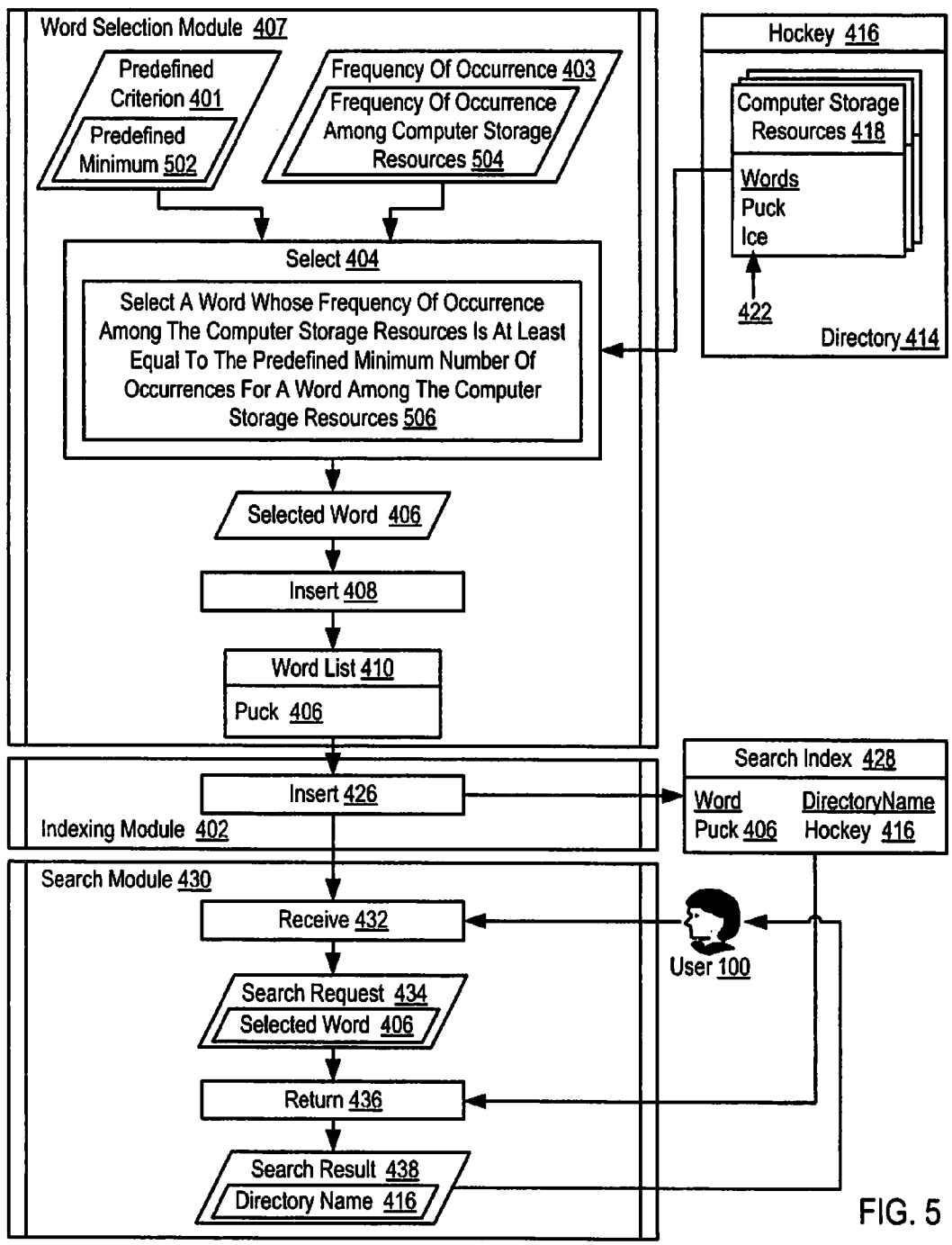
FIG. 5 sets forth a flow chart illustrating an exemplary method for searching for a directory in a file system according to embodiments of the present invention.

For further explanation, FIG. 5 sets forth a flow chart illustrating an exemplary method for searching for a directory in a file system according to embodiments of the present invention. The method of FIG. 5 is similar to the method of FIG. 3, including as it does the word selection module's (407) selecting (404) a word of text (422) whose frequency of occurrence (403) meets a predefined criterion (401), the word selection module's (407) inserting (408) the selected word (406) into the word list (410), the indexing module's (402) inserting (426) the selected word (406) in association with the directory name (416) into a search index (428), the search module's (430) receiving (432) a search request (434) that includes the selected word (406), and the search module's (430) returning (436) a search result (438) that includes the directory name (416), all of which operate in a similar manner as described above.

In the method of FIG. 5, however, the frequency of occurrence (403) is a frequency of occurrence (504) for the word of text among the computer storage resources. That is, the frequency of occurrence for a word of text is the total number of times the word of text occurs among the computer storage resources. If for example, a word of text occurs 20 times in one computer storage resource and 30 times in another storage resource, the frequency of occurrence of the word of text is 50.

In the method of FIG. 5, the predefined criterion (401) is a predefined minimum number (502) of occurrences for a word of text among the computer storage resources. That is, in order for the word selection module (407) to select a word of text for inclusion in the word list (410), the word of text must occur among the computer storage resources at least a predefined minimum number of times.

In the method of FIG. 5, selecting (404) a word of text (422) for inclusion in a word list is carried out by selecting (506), by the word selection module (407), a word of text (422) whose frequency of occurrence (504) among the computer storage resources is at least equal to the predefined minimum number (502) of occurrences for a word of text among the computer storage resources. The word selection module (407) may select (506) a word of text by comparing the frequency of occurrence (504) of a word of text among computer storage resources to the predefined minimum number (502) of occurrence for a word of text among the computer storage resources. If a word of text (422) has a frequency of occurrence equal to 17, for example, and the predefined minimum number (502) of occurrences for a word of text among the computer storage resources (418) is 15, the word of text is selected for inclusion in the word list. In the example of FIG. 5, assume the word, Puck, has a frequency of occurrence (504) among computer storage resources equal to 30, and the predefined the predefined minimum number (502) of occurrences for a word of text among the computer storage resources is 15. When the word selection module determines that Puck has a frequency of occurrence among the computer storage resources at least equal to the predefined minimum number of occurrence for a word among the computer storage resources, the word selection module (402) selects Puck for inclusion in a word list (410).

Although the method of FIG. 5 depicts one way that a word selection module may select a word of text for inclusion in a word list, readers of skill in the art will recognize that an word selection module according to embodiments of the present invention may select words of text for inclusion in a word list in many different ways. For further explanation, therefore, FIG. 6 sets forth a flow chart illustrating an exemplary method for searching for a directory in a file system according to embodiments of the present invention. The method of FIG. 6 is similar to the method of FIG. 3, including as it does the word selection module's (407) selecting (404) a word of text (422) whose frequency of occurrence (403) meets a predefined criterion (401), the word selection module's (407) inserting (408) the selected word (406) into the word list (410), the indexing module's (402) inserting (426) the selected word (406) in association with the directory name (416) into a search index (428), the search module's (430) receiving (432) a search request (434) that includes the selected word (406), and the search module's (430) returning (436) a search result (438) that includes the directory name (416), all of which operate in a similar manner as described above.

Figure 6:
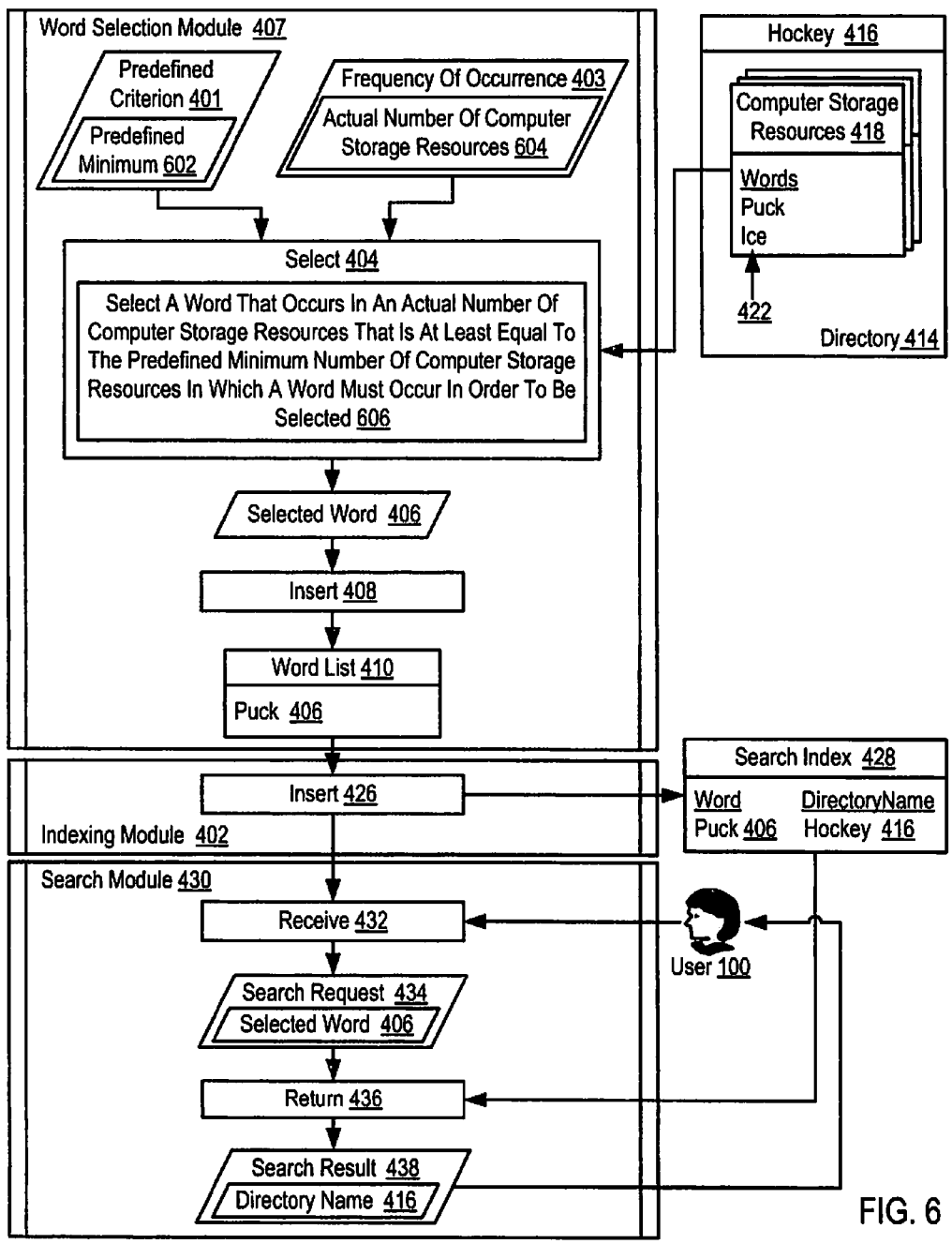
FIG. 6 sets forth a flow chart illustrating an exemplary method for searching for a directory in a file system according to embodiments of the present invention.

In the method of FIG. 6, however the frequency of occurrence (403) is an actual number of computer storage resources (604) in which the word of text (422) occurs. That is, the frequency of occurrence is the number of computer storage resources containing the word of text. In the method of FIG. 6, for example assume that the word of text (422), Puck, occurs 20 times in one computer storage resource, 30 times in a second computer storage resource, and 1 time in a third computer storage resource. The frequency of occurrence (403) of Puck is equal to 3, the actual number of computer storage resources in which Puck occurs.

In the method of FIG. 6, the predefined criterion (401) is a predefined minimum number (602) of computer storage resources in which a word of text must occur in order to be selected. That is, in order for the word selection module (407) to select a word of text for inclusion in the word list, the word of text must occur in at least a predefined minimum number of computer storage resources.

In the method of FIG. 6, selecting (404) a word of text (422) whose frequency of occurrence (403) meets a predefined criterion (401) is carried out by selecting (606) a word of text (422) that occurs in an actual number (604) of computer storage resources that is at least equal to the predefined minimum number (602) of computer storage resources in which a word of text must occur in order to be selected. The word selection module (407) may select (606) a word of text (422) by comparing the actual number of computer storage resources (418) in which the word of text (422) occurs to the predefined minimum number (602) of computer storage resources (518) in which a word of text must occur in order to be selected. Continuing with the example above where Puck occurs in 3 computer storage resources, if the predefined minimum number is 2, the word selection module selects Puck for inclusion in the word list.

Exemplary embodiments of the present invention are described largely in the context of a fully functional computer system for searching for a directory in a file system. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of searching for a directory in a file system, the directory characterized by a directory name, the directory comprising computer storage resources, the computer storage resources including words of text, each word of text characterized by a frequency of occurrence among the computer storage resources, the method comprising:

selecting, by a word selection module for inclusion in a word list, a word of text whose frequency of occurrence meets a predefined criterion;

inserting, by the word selection module into the word list, the selected word;

inserting, by an indexing module into a search index, the selected word in association with the directory name;

receiving, by a search module from a user, a search request that includes the selected word;

returning, by the search module to the user in dependence upon the search request and the search index, a search result that includes the directory name, wherein:

the predefined criterion comprises a predefined minimum number of computer storage resources in which a word of text must occur in order to be selected;

the frequency of occurrence comprises an actual number of computer storage resources in which the word of text occurs; and selecting a word of text whose frequency of occurrence meets a predefined criterion further comprises selecting a word of text that occurs in an actual number of computer storage resources that is at least equal to the predefined minimum number of computer storage resources in which a word of text must occur in order to be selected.

2. The method of claim 1 wherein computer storage resources further comprise subdirectories and files, the subdirectories and file further comprising words of text.

3. The method of claim 1 wherein selecting a word of text whose frequency of occurrence meets a predefined criterion further comprises determining a frequency of occurrence for the word of text.

4. The method of claim 1 further comprising determining, by the word selection module asynchronously with respect to selecting a word text whose frequency of occurrence meets a predefined criterion, a frequency of occurrence for the word of text.

5. The method of claim 1 wherein:

the predefined criterion comprises a predefined minimum number of occurrences for a word of text among the computer storage resources;

the frequency of occurrence comprises a frequency of occurrence for the word of text among the computer storage resources; and selecting a word of text whose frequency of occurrence meets a predefined criterion further comprises selecting a word of text whose frequency of occurrence among the computer storage resources is at least equal to the predefined minimum number of occurrences for a word of text among the computer storage resources.

6. Apparatus for searching for a directory in a file system, the directory characterized by a directory name, the directory comprising computer storage resources, the computer storage resources including words of text, each word of text characterized by a frequency of occurrence among the computer storage resources, the apparatus comprising a computer processor, a computer memory operatively coupled to the computer processor, the computer memory having disposed within it computer program instructions capable of:

selecting, by a word selection module for inclusion in a word list, a word of text whose frequency of occurrence meets a predefined criterion;

inserting, by the word selection module into the word list, the selected word;

inserting, by an indexing module into a search index, the selected word in association with the directory name;

receiving, by a search module from a user, a search request that includes the selected word;

returning, by the search module to the user in dependence upon the search request and the search index, a search result that includes the directory name, wherein:

the predefined criterion comprises a predefined minimum number of computer storage resources in which a word of text must occur in order to be selected:

the frequency of occurrence comprises an actual number of computer storage resources in which the word of text occurs; and selecting a word of text whose frequency of occurrence meets a predefined criterion further comprises selecting a word of text that occurs in an actual number of computer storage resources that is at least equal to the predefined minimum number of computer storage resources in which a word of text must occur in order to be selected.

7. The apparatus of claim 6 wherein computer storage resources further comprise subdirectories and files, the subdirectories and file further comprising words of text.

8. The apparatus of claim 6 wherein selecting a word of text whose frequency of occurrence meets a predefined criterion further comprises determining a frequency of occurrence for the word of text.

9. The apparatus of claim 6 further comprising computer program instructions capable of determining, by the word selection module asynchronously with respect to selecting a word text whose frequency of occurrence meets a predefined criterion, a frequency of occurrence for the word of text.

10. The apparatus of claim 6 wherein:
the predefined criterion comprises a predefined minimum number of occurrences for a word of text among the computer storage resources;
the frequency of occurrence comprises a frequency of occurrence for the word of text among the computer storage resources; and
selecting a word of text whose frequency of occurrence meets a predefined criterion further comprises selecting a word of text whose frequency of occurrence among the computer storage resources is at least equal to the predefined minimum number of occurrences for a word of text among the computer storage resources.

11. A computer program product for searching for a directory in a file system, the directory characterized by a directory name, the directory comprising computer storage resources, the computer storage resources including words of text, each word of text characterized by a frequency of occurrence among the computer storage resources, the computer program product disposed in a computer readable storage medium, the computer program product comprising computer program instructions capable of:
selecting, by a word selection module for inclusion in a word list, a word of text whose frequency of occurrence meets a predefined criterion;
inserting, by the word selection module into the word list, the selected word;
inserting, by an indexing module into a search index, the selected word in association with the directory name;
receiving, by a search module from a user, a search request that includes the selected word;
returning, by the search module to the user in dependence upon the search request and the search index, a search result that includes the directory name, wherein:
the predefined criterion comprises a predefined minimum number of computer storage resources in which a word of text must occur in order to be selected;
the frequency of occurrence comprises an actual number of computer storage resources in which the word of text occurs; and
selecting a word of text whose frequency of occurrence meets a predefined criterion further comprises selecting a word of text that occurs in an actual number of computer storage resources that is at least equal to the predefined minimum number of computer storage resources in which a word of text must occur in order to be selected.

12. The computer program product of claim 11 wherein computer storage resources further comprise subdirectories and files, the subdirectories and file further comprising words of text.

13. The computer program product of claim 11 wherein selecting a word of text whose frequency of occurrence meets a predefined criterion further comprises determining a frequency of occurrence for the word of text.

14. The computer program product of claim 11 further comprising computer program instructions capable of determining, by the index module asynchronously with respect to selecting a word text whose frequency of occurrence meets a predefined criterion, a frequency of occurrence for the word of text.

15. The computer program product of claim 11 wherein:
the predefined criterion comprises a predefined minimum number of occurrences for a word of text among the computer storage resources;
the frequency of occurrence comprises a frequency of occurrence for the word of text among the computer storage resources; and
selecting a word of text whose frequency of occurrence meets a predefined criterion further comprises selecting a word of text whose frequency of occurrence among the computer storage resources is at least equal to the predefined minimum number of occurrences for a word of text among the computer storage resources.

* * * * *